(12) United States Patent
Roddenberry (10) Patent No.: US 9,133,978 B2
(45) Date of Patent: Sep. 15, 2015

(54) MOUNTABLE ATTACHMENT APPARATUS AND METHOD

(71) Applicant: Jeffrey Scott Roddenberry, Gulf Breeze, FL (US)

(72) Inventor: Jeffrey Scott Roddenberry, Gulf Breeze, FL (US)

( * ) Notice: Subject to any disclaimer, the term of this patent is extended or adjusted under 35 U.S.C. 154(b) by 285 days.

(21) Appl. No.: 13/573,883

(22) Filed: Oct. 12, 2012

(65) Prior Publication Data

US 2014/0101913 A1  Apr. 17, 2014

(51) Int. Cl.
| | |
|---|---|
| *F16M 13/00* | (2006.01) |
| *F16M 13/02* | (2006.01) |
| *F16B 23/00* | (2006.01) |
| *A47G 1/16* | (2006.01) |
| *F16B 35/06* | (2006.01) |
| *F16B 45/00* | (2006.01) |
| *A62C 13/78* | (2006.01) |

(52) U.S. Cl.
CPC ............. *F16M 13/02* (2013.01); *A47G 1/1606* (2013.01); *F16B 23/00* (2013.01); *F16B 35/06* (2013.01); *A62C 13/78* (2013.01); *F16B 45/00* (2013.01); *Y10T 29/49826* (2015.01)

(58) Field of Classification Search
USPC .............. 248/546, 497, 216.1, 217.4, 231.91; 411/397, 480
See application file for complete search history.

(56) References Cited

U.S. PATENT DOCUMENTS

| | | | | |
|---|---|---|---|---|
| 168,113 | A * | 9/1875 | Smith | 248/497 |
| 478,313 | A * | 7/1892 | Davis | 411/342 |
| 750,070 | A * | 1/1904 | Stevenson | 24/580.1 |
| 927,367 | A * | 7/1909 | Marshall | 52/374 |
| 1,907,495 | A * | 5/1933 | Brunski | 248/497 |
| 2,460,568 | A * | 2/1949 | Buehner | 248/216.1 |
| 2,701,115 | A * | 2/1955 | Pollock et al. | 248/71 |
| 4,074,888 | A * | 2/1978 | Garner | 248/475.1 |
| 4,169,308 | A * | 10/1979 | Minogue | 29/407.1 |
| 4,659,051 | A * | 4/1987 | Propp et al. | 248/546 |
| 4,856,953 | A * | 8/1989 | Lin | 411/383 |
| 5,669,592 | A * | 9/1997 | Kearful | 248/217.4 |
| 5,797,581 | A * | 8/1998 | Sherman | 248/544 |
| 6,361,258 | B1 * | 3/2002 | Heesch | 411/178 |
| 6,969,039 | B1 * | 11/2005 | Diggle et al. | 248/546 |
| 7,975,973 | B1 * | 7/2011 | Weeden | 248/217.4 |
| 8,474,770 | B2 * | 7/2013 | Reo et al. | 248/224.7 |
| 8,628,049 | B2 * | 1/2014 | Ghatikar | 248/201 |
| 8,752,803 | B2 * | 6/2014 | Goldberg et al. | 248/490 |
| 8,832,920 | B2 * | 9/2014 | Goldberg | 29/525.02 |

* cited by examiner

*Primary Examiner* — Bradley Duckworth
(74) *Attorney, Agent, or Firm* — J. Nevin Shaffer, Jr.

(57) ABSTRACT

A mountable attachment apparatus and method includes an attachment shaft where the attachment shaft is at least partially tapered. A combination headless drive shaft-hang shaft is connected with the attachment shaft. The headless drive shaft-hang shaft includes a hang shaft connected to the attachment shaft and the hang shaft includes a mounting element in the hang shaft. The combination headless drive shaft-hang shaft also includes a drive shaft connected to the hang shaft and the drive shaft includes a drive element in the drive shaft. In combination the attachment shaft and the combination headless drive shaft-hang shaft form a single, rigid, undivided, straight shaft. Further, a stability plate is connected transversely between, and extending outwardly from, the attachment shaft and the hang shaft where the stability plate includes a first side facing the attachment shaft and a second side.

8 Claims, 6 Drawing Sheets

MOUNTABLE ATTACHMENT APPARATUS AND METHOD

FIELD OF THE INVENTION

This invention relates to a mountable attachment apparatus and method. In particular, in accordance with one embodiment, the invention relates to a mountable attachment apparatus consisting of an attachment shaft where the attachment shaft is at least partially tapered. A combination headless drive shaft-hang shaft is connected with the attachment shaft. The headless drive shaft-hang shaft includes a hang shaft connected to the attachment shaft and the hang shaft includes a mounting element in the hang shaft. The combination headless drive shaft-hang shaft also includes a drive shaft connected to the hang shaft and the drive shaft includes a drive element in the drive shaft. In combination the attachment shaft and the combination headless drive shaft-hang shaft form a single, rigid, undivided, straight shaft. Further, a stability plate is connected transversely between, and extending outwardly from, the attachment shaft and the hang shaft where the stability plate includes a first side facing the attachment shaft and a second side.

BACKGROUND OF THE INVENTION

A problem exists with regard to the art of hanging objects. The prior art is replete with various screws, nails and bolts designed to connect one object with another. Typically, these prior art devices include a shaft connected with a feature that enables mechanical movement of the shaft such as a "head" with a slot for a screw, a flat surface for a nail, or a polygon shaped head for a bolt, for example only and not by way of limitation. When the objective is to screw, nail or bolt two items together, the prior art devices are well suited to the task. However, when it is desired to hang an object from another object, a picture from a wall for example, the prior art requires at least two separate devices, screw, nail or bolt and a separate hanging device. Obviously, in some cases where a simple nail in the wall suffices as a picture hanger, no separate device is warranted. Again, though, in many cases a separate hanging device is desired to ensure a safe and secure result. When that is the case, the prior art requires multiple parts and difficult measurements to ensure that the object hangs at the correct level.

Another problem with the prior art is that once installed they are often difficult to remove and thus may cause damage to the supporting structure or the device itself such that if removed they are typically unfit for reuse. This increases material and labor costs.

Thus, there is a need in the art for a device that enables a user to employ a single device for use to attach and hang one object with another that is easy to attach and detach and provides a secure connection for objects to hang from. It therefore is an object of this invention to provide an attachment apparatus and method that provides a user with a simple to use, flexible attachment and mounting system for safely and securely attaching one object with another. It is a further object to provide a reusable attachment apparatus and method that may be just as easily removed as installed and that does not cause further damage to itself or the hanging surface during removal. It is yet another object to provide an attachment device that ensures that objects hung from it are securely positioned and easily removed and replaced.

SUMMARY OF THE INVENTION

Accordingly, the mountable attachment apparatus of the present invention, according to one embodiment, includes an attachment shaft where the attachment shaft is at least partially tapered. A combination headless drive shaft-hang shaft is connected with the attachment shaft. The headless drive shaft-hang shaft includes a hang shaft connected to the attachment shaft and the hang shaft includes a mounting element in the hang shaft. The combination headless drive shaft-hang shaft also includes a drive shaft connected to the hang shaft and the drive shaft includes a drive element in the drive shaft. In combination the attachment shaft and the combination headless drive shaft-hang shaft form a single, rigid, undivided, straight shaft. Further, a stability plate is connected transversely between, and extending outwardly from, the attachment shaft and the hang shaft where the stability plate includes a first side facing the attachment shaft and a second side.

All terms used herein are given their common meaning. Thus, "shaft" describes an extended portion of the device with any useful dimensions of length, width and breadth. As stated, the device forms a "single, rigid, undivided, straight shaft". These terms, given their common meaning, describe a solid device without joints, hinges or the like, that has and maintains a single linear axis and is not designed to bend or hinge or deviate from that axis in any meaningful amount or manner. In other words, it is one solid part.

"Headless" as used herein describes a shaft without a shaft portion that includes a slot, as in common screws, an extended flat surface, as with common nails, or an expanded and extend form for use with a wrench, as with a common bolt. "Straight", again, describes a shaft that is approximately linear and uncurved. "Partially tapered" identifies an attachment shaft that has a diminishing dimension along at least some of its length. A nail comes to a point along portion of its partially tapered length, for example only.

"Drive element" describes a portion of a shaft that is conformed for use in applying force to the device when attaching and removing the device as will be more fully described hereafter. "Mounting element" describes a portion of a shaft that is conformed for use in reliably attaching and detaching objects to the device, again, as will be described more fully hereafter. "Connected transversely" means a connection, for example, perpendicular to the longitudinal axis of the shaft.

According to another aspect of this invention the combination headless drive shaft-hang shaft includes a recess forming a female receiver in the drive shaft and the hang shaft and the recess is open on one end. The drive element in this aspect is the female receiver conformed to receive a male driver in the drive shaft and the mounting element is a transverse hole connected with the female receiver in the hang shaft. Here the term "recess" is used to describe a space made on the inside of the combination drive shaft-hang shaft. This space creates a "female receiver" meaning an opening into which a "male" extension is placed to drive the device.

In another aspect, the drive element is a male drive shaft with at least one flat gripping surface and the mounting element is screw threads surrounding the exterior of the hang shaft. Here the term "male drive shaft" describes a shaft designed to be placed into another device and the term "gripping surface" describes a surface shaped to provide and present a planar surface to a tool for use in applying force to the device. Further, "screw threads" identifies either outwardly projecting threads or inwardly formed channels, all as known in the art.

In another aspect, the mounting element includes at least one quick release indent in the surface of said hang shaft. "Quick release" describes a feature of the invention in which the mounting shaft includes a structure conformed for use to attach, secure and release an object from the mounting shaft.

In another aspect, the mounting element is at least one compressible connector outwardly extended from the hang shaft. A spring loaded ball bearing extending from the surface of the hang shaft, for example only and not by way of limitation, is an example of a compressible connector outwardly extending from the hang shaft.

In one aspect, the mounting element is a transverse hole from side to side and completely through the hang shaft. In another aspect, the mounting element is a twist lock recess in the combination headless drive shaft-hang shaft. In a further aspect, the mounting element is at least two slots formed in the surface of the hang shaft and in one aspect, the mounting element is at least two cross bars extending from the surface of the hang shaft.

According to another embodiment of the invention, a mountable attachment apparatus includes an attachment shaft where the attachment shaft is at least partially tapered. A combination headless drive shaft-hang shaft is connected with the attachment shaft. The headless drive shaft-hang shaft includes a hang shaft connected to the attachment shaft where the hang shaft includes a mounting element in said hang shaft. Further, the combination headless drive shaft-hang shaft includes a drive shaft connected to the hang shaft where the drive shaft includes a drive element in the drive shaft. The drive element is shaped to connect with a power tool and, in combination, the attachment shaft and the combination headless drive shaft-hang shaft form a single, rigid, undivided, straight shaft. Further, a stability plate is connected transversely between, and extending outwardly from, the attachment shaft and the hang shaft where the stability plate includes a first side facing the attachment shaft and a second side and the first side includes a gripping element.

The term "power tool" identifies a mechanical device powered in one way or another to drive another object. A cordless drill, for example only is a power tool included in the meaning of this invention. Further, the term "gripping element" identifies, for example only, small pointed projections perpendicular to the surface of the first side. It may be a rough surface of any sort such that when the first side is pressed against an object, the first surface "grips" it like cleats on a golf shoe grip the ground.

In another aspect of this invention, the combination headless drive shaft-hang shaft includes a recess forming a female receiver in the drive shaft and the hang shaft where the recess is open on one end, where the drive element is the female receiver conformed to receive a male power tool driver in the drive shaft and where the mounting element is a transverse hole connected with the female receiver in the hang shaft. In further aspect of this embodiment, the mounting element is a plurality of screw threads surrounding the exterior of the hang shaft.

In other aspects, the mounting element includes at least one quick release indent in the surface of the hang shaft or is at least one compressible connector outwardly extended from the hang shaft or is a transverse hole from side to side and completely through the hang shaft or is a twist lock recess in the combination headless drive shaft-hang shaft or is at least two slots formed in the surface of the hang shaft or the mounting element is at least two cross bars extending from the surface of the hang shaft.

According to another embodiment of the invention, a mountable attachment method consists of the steps of:

a. providing an attachment shaft where the attachment shaft is at least partially tapered; a combination headless drive shaft-hang shaft connected with the attachment shaft, where the headless drive shaft-hang shaft includes a hang shaft connected to the attachment shaft where the hang shaft includes a mounting element in the hang shaft and where the combination headless drive shaft-hang shaft includes a drive shaft connected to the hang shaft where the drive shaft includes a drive element in the drive shaft and where in combination the attachment shaft and the combination headless drive shaft-hang shaft form a single, rigid, undivided, straight shaft and a stability plate connected transversely between, and extending outwardly from, the attachment shaft and the hang shaft where the stability plate includes a first side facing the attachment shaft and a second side;

b. using the drive element to connect the attachment shaft with an object; and c. mounting another object on the hanging shaft by means of the mounting element.

In another aspect of this invention, the mounting element is selected from a group of mounting elements consisting of: a transverse hole connected with the female receiver in the hang shaft; at least one quick release indent in the surface of the hang shaft; at least one compressible connector outwardly extended from the hang shaft; a transverse hole from side to side and completely through the hang shaft; a twist lock recess in the combination headless drive shaft-hang shaft; at least two slots formed in the surface of the hang shaft; and at least two cross bars extending from the surface of the hang shaft.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1A:
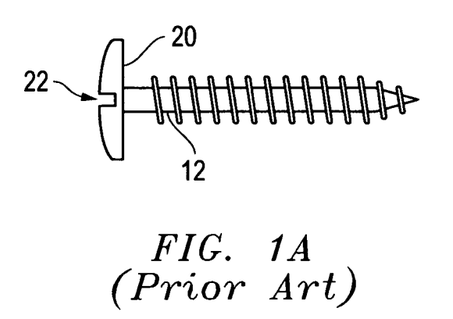
FIGS. 1A-F are side views of a prior art screw, nail, bolt including prior art heads, a screw with a curved hanging hook, a drill bit and a prior art bow hanger.
Figure 1B:
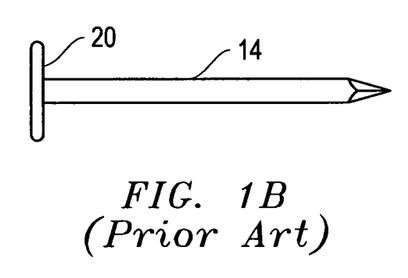
Figure 1C:
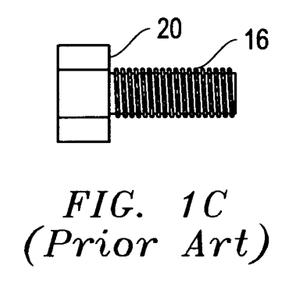
Figure 1D:
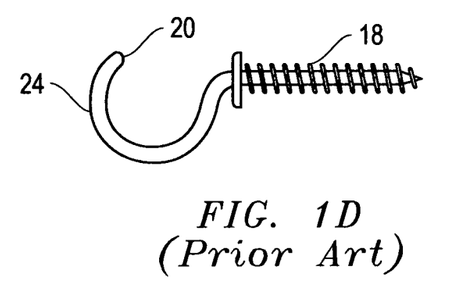

The preferred embodiment of the present invention is illustrated by way of example in FIGS. 2-11. With specific reference to FIG. 1, FIG. 1A shows a prior art screw 12, FIG. 1B a prior art nail 14 and FIG. 1C a prior art bolt 16. Also shown in FIG. 1D is a hand screw 18. Each prior art device includes a head 20. The head 20 for each is different for each device but in each case it provides a structure for enabling the application of force to the device. The head 20 of screw 12, for example, includes a slot 22 conformed to receive the tip of a screw driver (not shown). The slot 22 may be in any desired form now known or hereafter created. As shown, slot 22 is designed to cooperate with a "flat head" screw driver as is known in the art.

Head 20 of nail 14 is an extended flat surface used to receive blows from a hammer (not shown) and head 20 of bolt 16 is a built up extended polygonal form used to cooperate with a wrench/socket (not shown), all as known in the art and not described more fully hereafter.

Hand screw 18 is a screw in which the head 20 is formed by a curved extension 24 that also serves as a hook from which objects (not shown) may be hung. The user grasps the curved extension 24 and while forcing the hand screw 18 against an object (not shown) turns the curved extension 24 and screws the hand screw 18 into the object. When it is sufficiently attached, the hook formed from curved section 24, again, is used to hang things from.

Figure 1E:
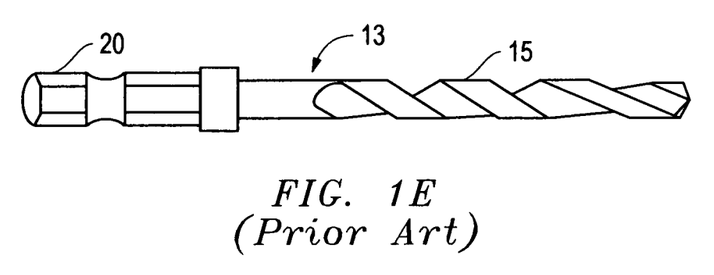

FIG. 1E shows a common drill bit 13 with a head 20 attached to a cutting bit 15. Drill bit 13 is a non-tapered shaft as shown since the purpose of a drill bit 15 is to drill a uniform dimension hole. Drill bits 13 are not designed to be left in place and are not sturdy enough to be regularly used for hanging objects from them.

Figure 1F:
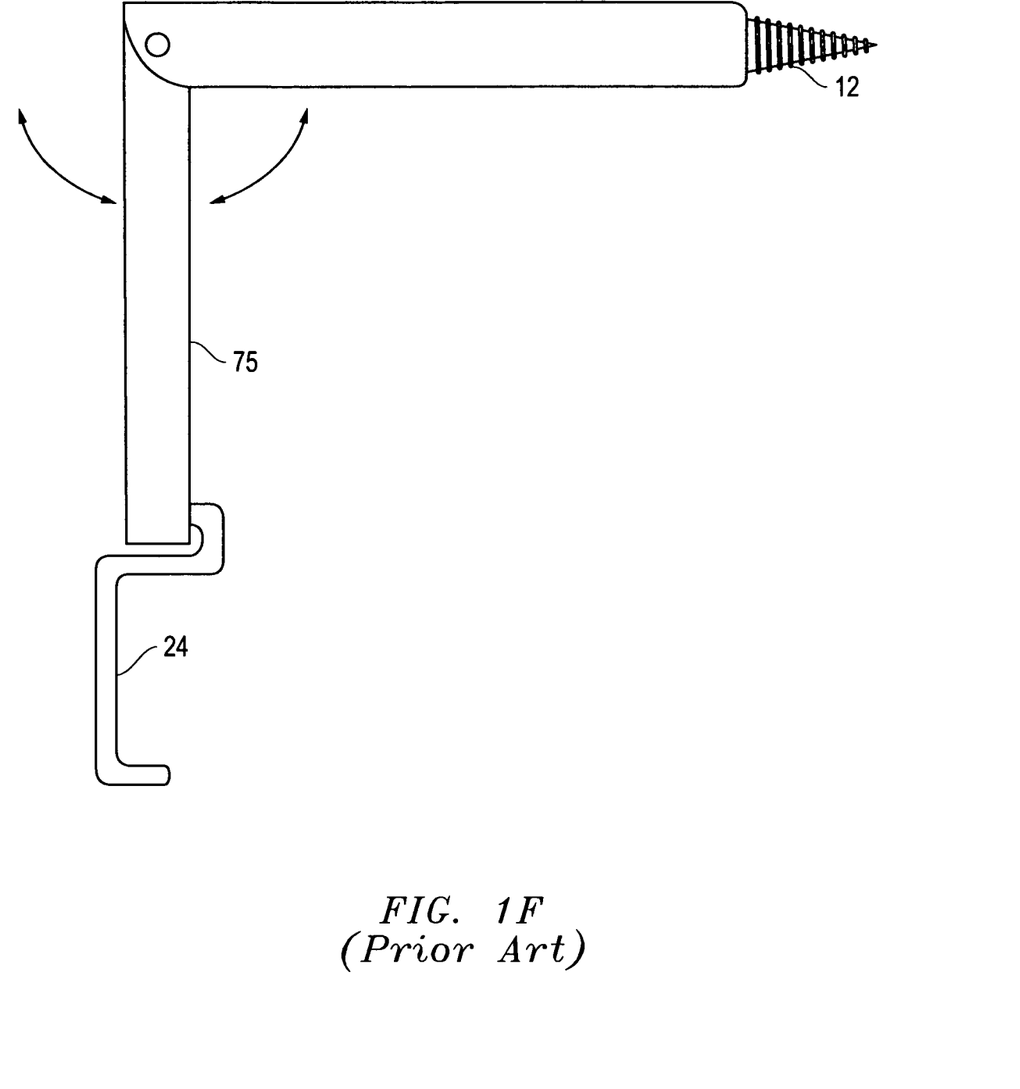

FIG. 1F shows a hunter's bow hanger 17 known in the art. Bow hanger 17 includes a screw 12 connected to arm 19. Arm 19 is connected with a hinge pin 21 to arm 23. Arm 23 when moved perpendicular to arm 19 as shown creates a lever to turn arm 19 and drill screw 12 into an object. Then arm 23 is returned to parallel with arm 19 and the bow (not shown) is hung off of curved extension 24 attached to arm 23. Bow hanger 17 is bulky and difficult to use in tight places as in tree stands, for example. Further, it not easily removed and repositioned.

Figure 2:
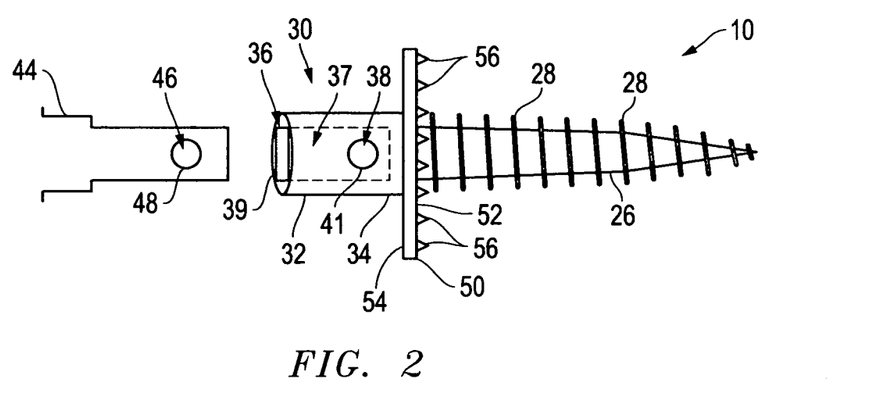
FIG. 2 is a side view of the mountable attachment device according to one embodiment with a recess forming a female receiver in the drive shaft-hang shaft.

Referring now to FIG. 2, mountable attachment apparatus 10 includes attachment shaft 26. In one embodiment, attachment shaft 26 includes externally extending screw threads 28. Combination headless drive shaft-hang shaft 30 is connected with attachment shaft 26. With reference to FIGS. 1A-F it is now made clear that the mountable attachment apparatus 10 of the present invention includes a combination drive shaft-hang shaft 30 that is "headless". That is, drive shaft 32 is essentially uniform in dimension along its length as is hang shaft 34 especially with regard to their maximum diameter. Here, combination drive shaft-hang shaft 30 is cylindrical in shape and, again, has an approximately uniform maximum diameter. In this form, drive element 36 is in the form of a recess 37 (shown in dotted lines). Recess 37 creates a female receiver 39 as the drive element 36. Female receiver 39 is conformed to receive a male driver (not shown). Recess 37 also extends to hang shaft 34. In this embodiment of the invention, mounting element 38 is in the form of a transverse hole 41 connected with the female receiver 39/recess 37. In use an object 44 may be connected with mountable attachment apparatus 10 with connector 46. In this embodiment, connector 46 is a spring loaded ball 48 which, when inserted into recess 37 is compressed and when positioned at hole 41 it extends into hole 41 to hold object 44 in place.

FIG. 2 also illustrates another important feature of the invention in stability plate 50. Stability plate 50 is located between attachment shaft 26 and hang shaft 34. It extends outward from its connection and is conformed to contact the surface of an object (not shown) to which attachment shaft 26 is attached. It serves to limit movement of the mounting attachment apparatus 10 when connected to another object. Stability plate 50 includes first surface 52 facing toward attachment shaft 26 and a second surface 54 facing toward hang shaft 34. In one embodiment, first surface 52 includes gripping element 56. Gripping element(s) 56 may be small sharp projections or spikes or simply a rough surface. In any case, gripping elements 56 help secure the mountable attachment apparatus 10 to an object by sticking into the object at least some little bit.

Figure 3:
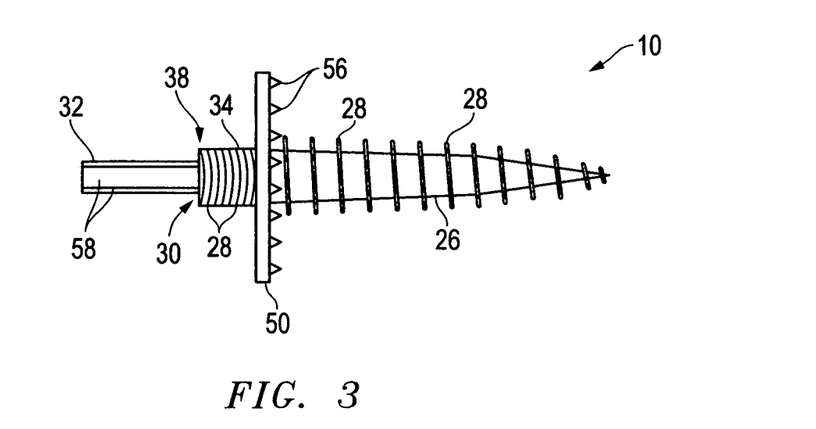
FIG. 3 is a side view of the mountable attachment device according to another embodiment including a male drive shaft and a mounting element in the form of screw threads on the outside of the mounting element.

Referring now to FIG. 3, in one embodiment the mountable attachment apparatus 10 includes a male drive shaft 32 with a flat gripping surface 58 and a mounting element 38 in the form of screw threads 28 on the outside of the mounting element 38 of hang shaft 34. In such an embodiment, the flat gripping surface 58 of male drive shaft 32 is inserted into a device for use in attaching the apparatus. Certainly drive shaft 32 is easily received by power tools (not shown) just as a drill bit receives the shaft of a drill. Thereafter, object 44 is connected with hang shaft 34 by an open ended screw cap (not shown) that screws onto the screw threads 28.

FIGS. 2 and 3 show drive shaft 32 connected seamlessly with hang shaft 34 and, in fact, the entire mountable attachment apparatus 10 is formed from a single, rigid, undivided, straight shaft of material.

Figure 4:
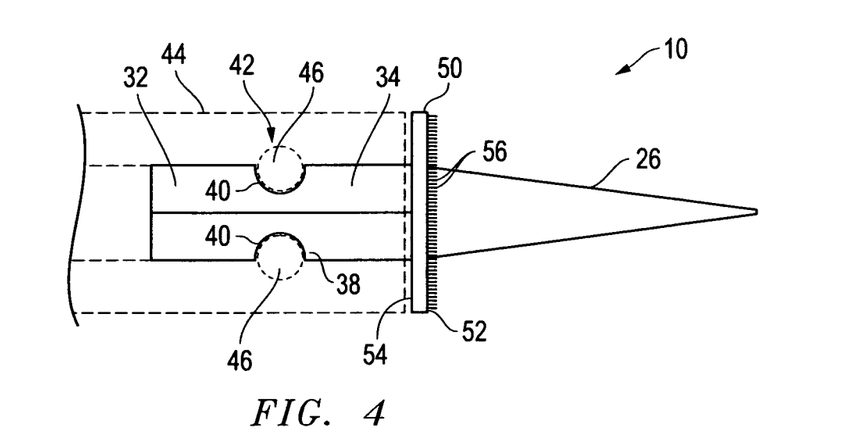
FIG. 4 is a side view of an embodiment of the invention with a drive shaft with at least one flat gripping surface and with a mounting element in the form of an indent in the hang shaft and, in dotted lines, a device connected to the hang shaft.

Referring now to FIG. 4, illustrates a further important embodiment of the invention in the form of one type of mounting element 38. Mounting element 38 in this case is an indent 40 in hang shaft 34. In a preferred embodiment, mounting element 38 indent 40 is conformed to operate as a quick release device 42 in which an object 44 (dotted lines) fits over the combination drive shaft-hang shaft 30. Object 44 has a connector 46 (dotted lines), a ball bearing or ring for example, that extends into indent 40 and is held there until allowed to retract therefrom, as is known in the art. The important feature is that the hang shaft 34 incorporates the quick release device 42 as a preferred mounting element 38. Applicant has found that the quick release device 42 provides a fast, sure way to connect and disconnect objects 44 to the hang shaft 34 of mountable attachment apparatus 10.

Figure 5:
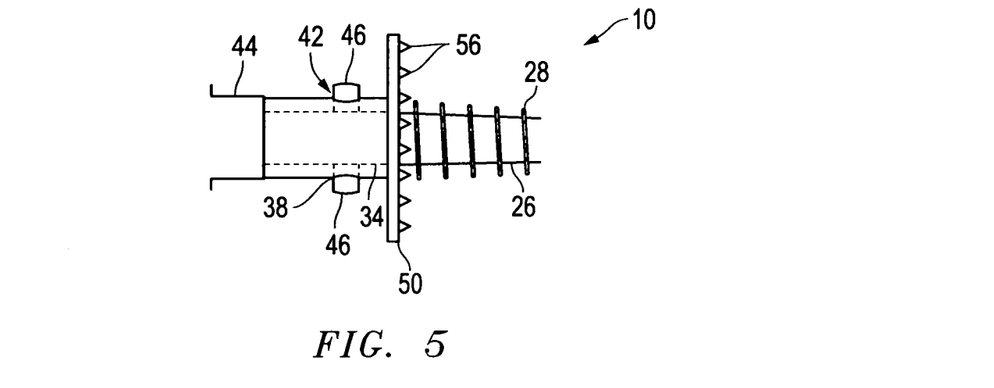
FIG. 5 is a side view of the invention with the mounting element in the form of at least one compressible connector outwardly extended from the hang shaft.

FIG. 5 shows an embodiment in which the mounting element 38 is in the form of connector(s) 46 that cooperate with object 44 that has holes that allows connectors 46 to extend into them and to secure object 44 to hang shaft 34.

Figure 6:
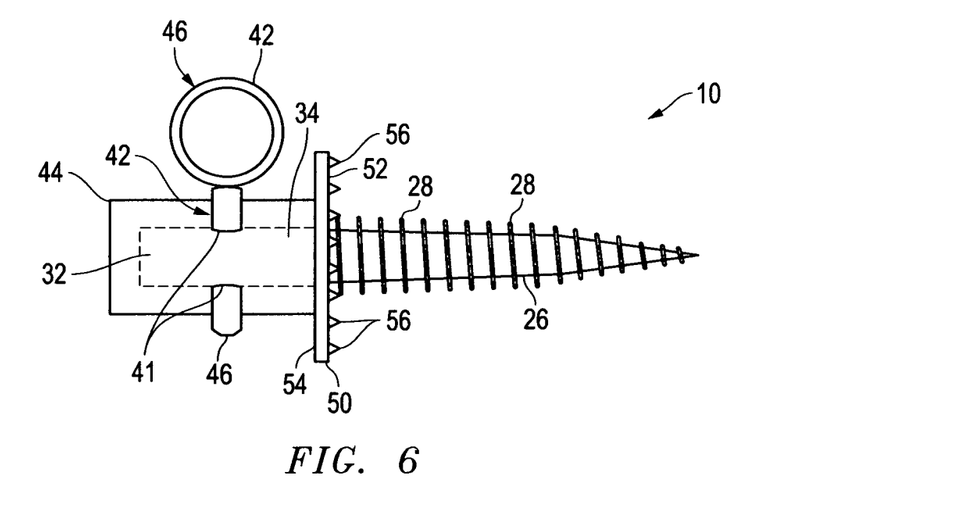
FIG. 6 is a side view of the invention with the mounting element in the form of a transverse hole from side to side and completely through the hang shaft.

FIG. 6 shows an embodiment in which the mounting element 38 consists of a hole 41 that passes completely through hang shaft 34. Then, when object 44 is slipped over combination drive shaft-hang shaft 30, holes 41 in object 44 align with holes 41 in hang shaft 34. At that point, a connector 46 in the form of pin 47 is inserted through all the holes 41 thereby holding object 44 in place on hang shaft 34.

Figure 7:
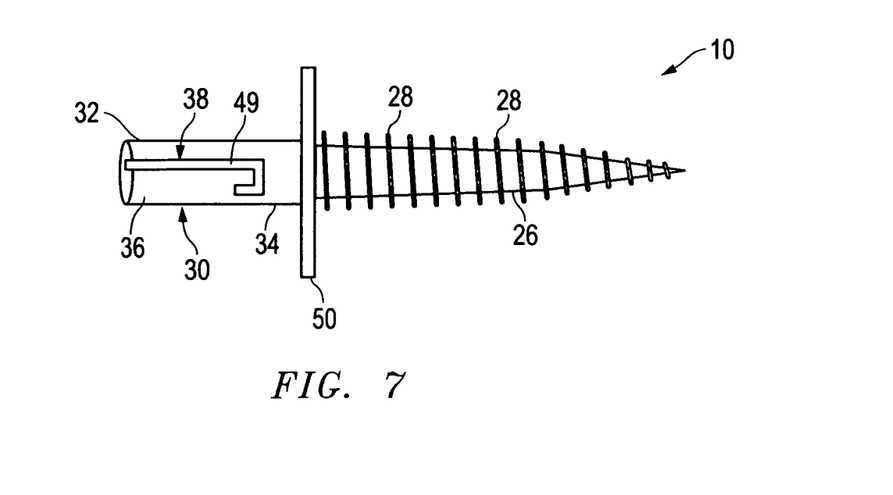
FIG. 7 is a side view of the invention with the mounting element in the form of a twist lock recess in the combination headless drive shaft-hang shaft.

FIG. 7 is a side view of the invention with the mounting element 38 in the form of a twist lock recess 49 in the combination headless drive shaft-hang shaft 30. Just like recess 37, twist lock recess 49 is formed into both the drive shaft 32 and the hang shaft 34 and is conformed to cooperate with a lock (not shown) on an object 44 to secure object 44 to hang shaft 34.

Figure 8:
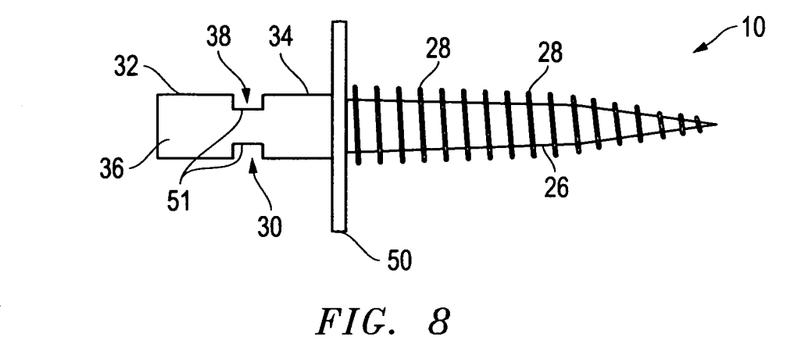
FIG. 8 is a side view of the invention with the mounting element in the form of at least two slots formed in the surface of the hang shaft.

FIG. 8 is a side view of the invention with the mounting element 38 in the form of at least two slots 51 formed in the surface of the hang shaft 34. Preferably, slots 51 are positioned opposite one another on hang shaft 34 and promote/enable a straddle style mounting method such that an object 44 with two corresponding edges (not shown) may be mutually inserted at the top of each slot and slid down the combination headless drive shaft-hang shaft 30 until they seat in place.

Figure 9:
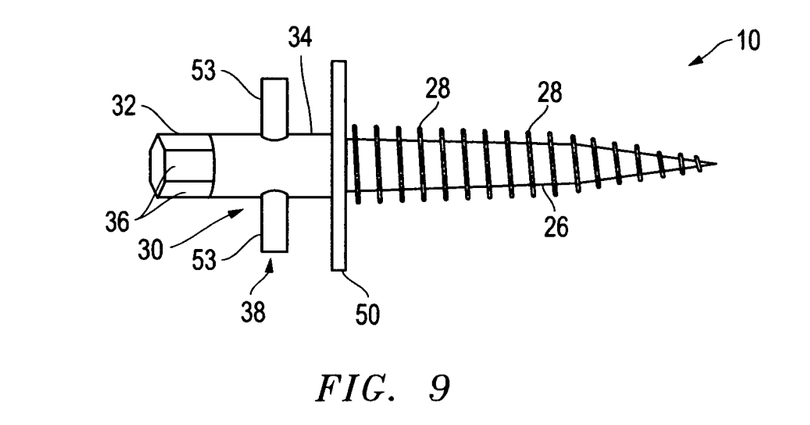
FIG. 9 is a side view of the invention with the mounting element in the form of at least two cross bars extending from the surface of the hang shaft.

FIG. 9 is a side view of the invention with the mounting element 38 in the form of at least two cross bars 53 extending from the surface of the hang shaft 34. This design, as does the slot 51 design above, promotes a straddle style mounting method as may be desired.

Figure 10:
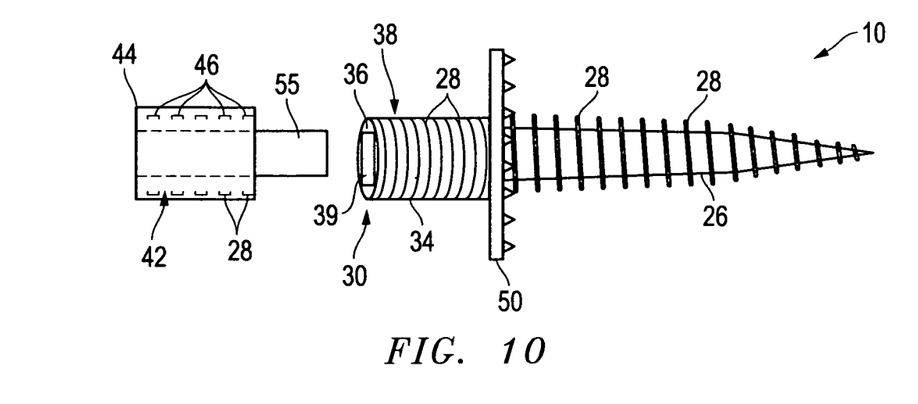
FIG. 10 is a side view of an embodiment of the invention with drive element in the form of a female receiver and the mounting element in the form of screw threads on the outside of the hang shaft.

FIG. 10 is a side view of an embodiment of the invention with drive element 36 in the form of a female receiver 39 and the mounting element 38 in the form of screw threads 28 on the outside of the hang shaft 34. In this embodiment, object 44 includes a male driver 55 that fits in female receiver 39. Object 44 also includes a female connector 46 that screws onto screw threads 28 to quickly secure and release object 44 to hang shaft 34.

By way of further explanation, mountable attachment apparatus 10 includes a threaded attachment shaft 26 that blends into a preferably hexagonally shaped combination headless drive shaft-hang shaft 30. The hexagonal shape provides a preferred gripping surface 58 for a better connection to a power tool. Certainly, cylindrically shafts are functional as well. In any case, the drive shaft 32 is easily captured by conventional power tools with standard receivers such as sockets, wrenches and especially keyed and keyless chucks of both powered and manual devices. This provides the advantage of a secure connection that prevents dropping of the device and prevents marred surfaces due to miscued screws.

In operation, for example only, the user inserts the drive shaft 32 into the tool and operates the tool to drive the attachment shaft 26 into a surface, such as a wall or tree for example only. Once connected with the surface, the user removes the tool and then connects an object 44 to hang shaft 34 with one of a variety of mounting elements 38. Preferably mounting element 38 is a quick release device 42. Object 44 must, of course, conform to the dimensions of the combination drive shaft-hang shaft 30. In that regard, the combined shafts are straight with an essentially uniform maximum diameter. Virtually anything that may be useful may be attached in a secure easily attached and removed manner.

Stability plate 50 helps prevent rocking of the device when attached to an object. It may or may not include a gripping element such as roughed first surface 52, for example only. Gripping element 56 may consist of a split locking type washer or any other type that may be useful.

Figure 11:
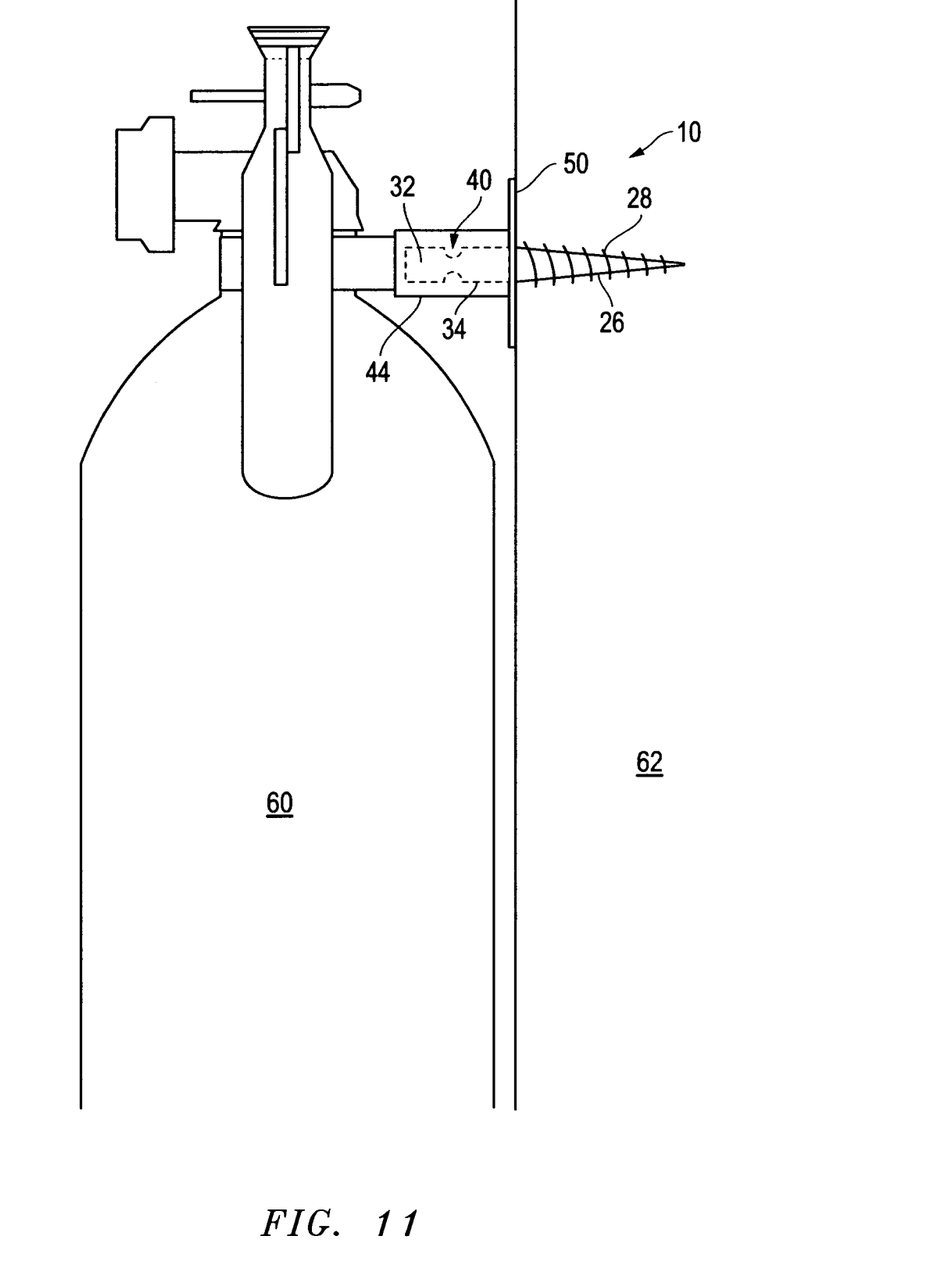
FIG. 11 is a side view of the mountable attachment device used to support a fire extinguisher.

Referring to FIG. 11, the use of the invention is illustrated where a fire extinguisher 60 is hung from a wall 62. After screwing the attachment shaft 26 into wall 62 with a tool (not shown), preferably a power tool, an object 44, such as fire extinguisher 60, is connected preferably by means of a quick release device 42, to the hang shaft 34. Once attached it is secure and safe from removal until needed. Thereafter it is easily released from connection and made available for use.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A mountable attachment apparatus comprising:
   a. a single shaft, including a first end, a middle and a second end forming three sections wherein said three sections include an attachment shaft section, a hang shaft section and a drive shaft section, wherein said attachment shaft section forms the first end and includes screw threads along some of said attachment shaft section and said attachment shaft section ends in a point and is at least partially tapered along its length;
   b. wherein said hang shaft section forms the middle of said single shaft, said hang shaft section connected with said attachment shaft section, wherein said hang shaft section includes a mounting element that is an integral part of the hang shaft wherein said mounting element is configured to include at least one indent on the surface of said hang shaft section and wherein said drive shaft section forms the second end of said single shaft, said drive shaft section connected to said hang shaft section wherein said drive shaft section includes a drive element in said drive shaft section on the outer surface of said drive shaft and wherein the drive shaft section ends without a peripherally extended head and wherein in combination said attachment shaft section, said hang shaft section and said drive shaft section form a single, rigid, undivided, straight shaft and wherein said hang shaft section and said drive shaft section are the same cross section width; and
   c. a stability plate connected transversely between, and extending outwardly from, said attachment shaft section and said hang shaft section wherein said stability plate includes a first side facing said attachment shaft section and a second side.

2. The apparatus of claim 1 wherein said drive element is at least one flat gripping surface on the outer surface of the drive shaft section.

3. The apparatus of claim 1 wherein said mounting element includes a pair of oppositely positioned indents in the surface of said hang shaft section.

4. The apparatus of claim 1 wherein said mounting element receives at least one connector outwardly extended from the at least one indent in the surface of said hang shaft section.

5. The apparatus of claim 1 wherein said mounting element includes a transverse hole at the at least one indent in the surface of said hang shaft section from side to side and completely through said hang shaft section.

6. The apparatus of claim 1 wherein said mounting element includes at least two straight sided slots formed in the surface of said hang shaft section.

7. The apparatus of claim 1 wherein said first side of said stability plate includes a gripping element.

8. A mountable attachment method comprising:
   a. providing an attachment shaft comprising a single shaft, including a first end, a middle and a second end forming three sections wherein said three sections include an attachment shaft section, a hang shaft section and a drive shaft section, wherein said attachment shaft section forms the first end and includes screw threads along some of said attachment shaft section and said attachment shaft section ends in a point and is at least partially tapered along its length; wherein said hang shaft section forms the middle of said single shaft, said hang shaft section connected with said attachment shaft section, wherein said hang shaft section includes a mounting element that is an integral part of the hang shaft wherein said mounting element is configured to include at least one indent on the surface of said hang shaft section and wherein said drive shaft section forms the second end of said single shaft, said drive shaft section connected to said hang shaft section wherein said drive shaft section includes a drive element in said drive shaft section on the outer surface of said drive shaft and wherein the drive shaft section ends without a peripherally extended head and wherein in combination said attachment shaft section, said hang shaft section and said drive shaft section form a single, rigid, undivided, straight shaft and wherein said hang shaft section and said drive shaft section are the same cross section width; and a stability plate connected transversely between, and extending outwardly from, said attachment shaft section and said hang shaft section wherein said stability plate includes a first side facing said attachment shaft section and a second side;

b. using said drive element to connect said attachment shaft with an object; and c. mounting another object on said hang shaft section by means of said mounting element.

\* \* \* \* \*